(12) United States Patent
Aschauer et al.

(10) Patent No.: US 11,018,846 B2
(45) Date of Patent: May 25, 2021

(54) METHODS AND APPARATUSES FOR ACHIEVING A SECURITY FUNCTION, IN PARTICULAR IN THE ENVIRONMENT OF A DEVICE AND/OR INSTALLATION CONTROLLER

(71) Applicant: Siemens Aktiengesellschaft, Munich (DE)

(72) Inventors: Hans Aschauer, Munich (DE); Rainer Falk, Poing (DE); Kai Fischer, Baldham (DE); Steffen Fries, Baldham (DE); Markus Heintel, Munich (DE); Wolfgang Klasen, Ottobrunn (DE); Axel Pfau, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 162 days.

(21) Appl. No.: 16/051,581

(22) Filed: Aug. 1, 2018

(65) Prior Publication Data

US 2019/0044696 A1 Feb. 7, 2019

(30) Foreign Application Priority Data

Aug. 2, 2017 (EP) .................................. 17184453

(51) Int. Cl.
*G06F 21/00* (2013.01)
*H04L 9/00* (2006.01)
(Continued)

(52) U.S. Cl.
CPC .............. *H04L 9/003* (2013.01); *H04L 9/085* (2013.01); *H04L 9/0877* (2013.01);
(Continued)

(58) Field of Classification Search
CPC ......... H04L 9/08; H04L 9/0816; H04L 9/085; H04L 9/0861; H04L 9/0877;
(Continued)

(56) References Cited

U.S. PATENT DOCUMENTS

| 8,989,386 B2 | 3/2015 | Falk |
| 2011/0072279 A1* | 3/2011 | Milliken ................. G06F 21/71 713/194 |

(Continued)

FOREIGN PATENT DOCUMENTS

| CN | 102792629 A | 11/2012 |
| CN | 103825733 A | 5/2014 |

(Continued)

OTHER PUBLICATIONS

Yingli Zeng et al: "A key escrow scheme to IOT based on Shamir", 2013 International Conference on Communications, Circuits and Systems (ICCCAS). IEEE, vol. 2, pp. 94-97, XP032578377, DOI: 10.1109/ICCCAS.2013.6765293; 2013.

(Continued)

*Primary Examiner* — Edward Zee
(74) *Attorney, Agent, or Firm* — Schmeiser, Olsen & Watts LLP

(57) ABSTRACT

A method for achieving a security function for a security control device for controlling a device or an installation, including: a) providing at least one first partial secret that is stored in a basic control device, b) providing at least one second partial secret that is stored in a security module, c) combining the at least one first and second partial secret to form an overall secret, required to achieve the security function, within the time period in which the basic control device interacts with the security module via the first and second coupling interfaces, and d) disguising the combined overall secret outside the time period.

14 Claims, 1 Drawing Sheet

(51) Int. Cl.
    *H04L 29/06* (2006.01)
    *H04L 9/32* (2006.01)
    *H04L 9/08* (2006.01)

(52) U.S. Cl.
    CPC .......... *H04L 9/0897* (2013.01); *H04L 9/3278* (2013.01); *H04L 63/0414* (2013.01); *H04L 2209/127* (2013.01)

(58) Field of Classification Search
    CPC ....... H04L 9/3278; G06F 21/30; G06F 21/31; G06F 21/34; G06F 21/604
    See application file for complete search history.

(56) References Cited

U.S. PATENT DOCUMENTS

| | | | |
|---|---|---|---|
| 2012/0072736 A1 | 3/2012 | Kudoh et al. | |
| 2012/0198242 A1* | 8/2012 | Dalzell | G06F 21/55 713/190 |
| 2013/0010965 A1 | 1/2013 | Falk | |
| 2015/0101012 A1 | 4/2015 | White et al. | |
| 2015/0180654 A1 | 6/2015 | Falk | |
| 2015/0188718 A1* | 7/2015 | Falk | G09C 1/00 380/278 |
| 2017/0352297 A1 | 12/2017 | Aschauer et al. | |

FOREIGN PATENT DOCUMENTS

| | | |
|---|---|---|
| CN | 104734854 A | 6/2015 |
| CN | 104753667 A | 7/2015 |
| CN | 106664198 A | 5/2017 |
| DE | 102010011657 A1 | 9/2011 |
| EP | 3252550 A1 | 12/2017 |
| EP | 3252990 A1 | 12/2017 |
| WO | 2015127789 A1 | 9/2015 |

OTHER PUBLICATIONS

Krawczyk Hugo: "Cryptographic Extraction and Key Derivation: The HKDF Scheme"; Lecture Notes in Computer Science, Springer Berlin Heidelberg, Berlin, Heidelberg, XP055203776, ISSN: 0302-9743, ISBN: 978-3-54-045234-8, vol. 6223, pp., DOI: 10.1007/978-3-642-14623-7 34, p. 9, line 15, p. 14, line 6; 2010.

Wikipedia: "Secure multi-party computation", https://en.wikipedia.org/wiki/Secure_multi-party_computation; 2017.

Office Action in corresponding Chinese Patent Application No. 201810869684.7 dated Dec. 1, 2020. 9 pages.

\* cited by examiner

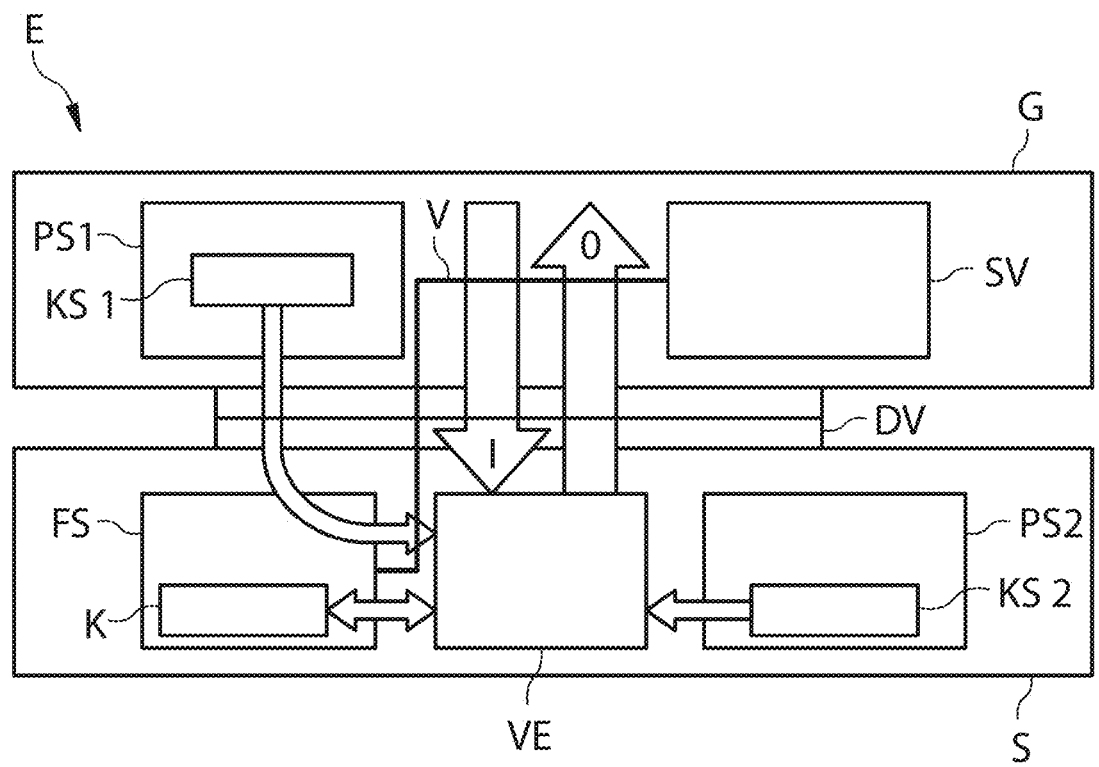

METHODS AND APPARATUSES FOR
ACHIEVING A SECURITY FUNCTION, IN
PARTICULAR IN THE ENVIRONMENT OF A
DEVICE AND/OR INSTALLATION
CONTROLLER

CROSS-REFERENCE TO RELATED
APPLICATIONS

This application claims priority to European application No. EP17184453 having a filing date of Aug. 2, 2017, the entire contents of both of which are hereby incorporated by reference.

FIELD OF TECHNOLOGY

The following relates to (operating) methods and apparatuses for a security control device for controlling a device or an installation, wherein the security control device comprises a basic control device and a security module, wherein the security module is able to be connected or is connected to the basic control device.

BACKGROUND

There is a need to protect products, for example devices, device components or software components, from manipulation and/or reverse engineering using IT security mechanisms. Cryptographic IT security mechanisms are already being used, for example, in smart devices, for example in devices of the Internet of Things, by cyberphysical systems, by energy technology automation systems or by industrial engineering manufacturing systems and by other installations.

Within the scope of the present description, the term "security" relates substantially to the security, confidentiality and/or integrity of data and of the transmission of the latter and also security, confidentiality and/or integrity when accessing corresponding data. Authentication during data transmission operations or during data access also falls under the term "security", as used within the scope of the present description. In this case, a module may be in the form of a hardware unit and/or a functional unit which may be configured using software and/or firmware. The function may be executed, for example, by means of a processor and/or a storage unit for storing program instructions.

The use of such security control devices and methods is possible. A security module has already been proposed in European patent application EP 16172472.9, for example. In this case, the security control device comprises a basic control device and a security module, wherein the security module is connected to the basic control device by means of a data connection via a data interface.

Group authentication of devices or else components of the latter has already been proposed in European application EP 16172887.8. The device is able to be authenticated only when all original components are available in the device.

Secure multi-party computation (MPC) is generally known in multi-party communication or messaging, it usually comes down to the parties being able to have private data (to be kept secret) calculated using a public function, possibly by means of a trust center, and obtaining a result without having to disclose their private data. In this case, the "trust center" checks whether the parties and their devices involved in communication are trustworthy. In this case, the various input values for the calculation are secret and are each known only to one party (or to a subset thereof). No additional trustworthy party should be required for the calculation. Cryptographic operations in connection with MPC are generally computationally intensive.

An HSM (hardware security module) denotes an internal or external peripheral device for efficiently and securely executing cryptographic operations or applications. This makes it possible, for example, to ensure the trustworthiness and the integrity of data and the associated information in security-critical IT systems. In the case of the virtual HSM, the cryptographic key of a virtual HSM is distributed among a plurality of server machines. In this case, the plurality of server machines together calculate a cryptographic operation using MPC without the HSM key being available.

With regard to the abovementioned IT security mechanisms, less complicated security methods and devices are needed, in particular in the industrial environment.

SUMMARY

An aspect relates to providing methods and apparatuses or devices with improved security properties, in particular in an industrial environment.

Embodiments of the invention include a security module for achieving a security function, suitable for a security control device for controlling a device or an installation, comprising:
  means for providing or executing a cryptographic functionality for a basic control device for achieving the security function, which basic control device is able to control a device that is able to be connected or is connected to the basic control device or an installation that is able to be connected or is connected thereto by means of the execution of a control program in the basic control device,
  wherein the security module is able to be connected or is connected, by means of a first coupling interface, to the basic control device by means of a second coupling interface matching the first coupling interface,
  means for receiving at least one first partial secret that is stored in the basic control device,
  means for providing at least one second partial secret that is stored in the security module,
  means for combining the at least one first and second partial secret to form an overall secret, required to achieve the security function, within the time period in which the basic control device interacts with the security module by means of the first and second coupling interfaces, and
  means for disguising the combined overall secret outside said interval of time.

In connection with embodiments of the invention, disguising may mean erasing and/or concealing and/or hiding and/or overwriting and/or masking. By disguising after combining the partial secrets to form an overall secret, security is increased such that an attacker is not able to ascertain the overall secret by manipulation. The overall secret may be the content of said combining means, which may be a buffer, described in more detail below, this content then being disguised.

Use may be made of corresponding means, for example in the form of sensors, that are suitable for detecting disconnection and/or eavesdropping and/or manipulation in the interaction, by means of said coupling interfaces, between the basic control device and the security module. Corresponding follow-up measures may be initiated on the basis of the detection. Manipulation in this case may also be bridging the disconnection of the connection. In this case, such a follow-up measure that relates to a security function of the security control device may be, for example, a corresponding alarm signal, a corresponding alarm message, deletion of keys, blocking of functionalities or further comparable and/or supplementary actions.

Embodiments of the invention furthermore claim a basic control device for achieving a security function, suitable for a security control device for controlling a device or an installation, which basic control device is able to control a device that is able to be connected or is connected to the basic control device or an installation that is able to be connected or is connected thereto by means of the execution of a control program in the basic control device, wherein the basic control device is able to be connected or is connected, by means of a first coupling interface, to a security module by means of a second coupling interface matching the first coupling interface, comprising:
- means for sending at least one first partial secret, which is stored in the basic control device, to the security module for the combination of the at least one first and of one at least second partial secret that is stored in the security module, to form an overall secret required to achieve the security function, and
- a control unit configured to control retaining of the content of a buffer provided for the overall secret and to initiate disguising of the content of the buffer.

In connection with embodiments of the invention, a memory or a memory unit may be understood to mean for example a memory in the form of a main memory (random access memory, RAM) or a hard disk. A main memory or a so-called cache (buffer memory) may be considered to be a buffer or else a volatile memory. The hard disk may be considered to be a permanent or persistent memory. The content of a volatile memory may usually be retained only with a corresponding power supply or battery buffer or capacitor buffering.

This control unit may be designed as a power supply unit that ensures that the content of the buffer is retained by means of a power supply and initiates the disguising of the content by interrupting the power supply. The interruption in the power supply is also associated with the interruption in the connection between the basic control device and the security module, as a result of which the security function is no longer able to be completely ensured. The manipulation mentioned above may also be caused by bridging the interrupted power supply.

Embodiments of the invention also claim a security control device that comprises the abovementioned basic control device and the abovementioned security module.

In this case, the security module should normally be classified as "trustworthy" with respect to the basic control device and vice versa in an industrial environment (installation, manufacturing system or the like). The complicated security mechanisms mentioned at the outset may therefore be avoided.

The security control device may be designed and set up, for example, as an automation system, a "controller", a programmable logic controller (a so-called "PLC"), an industrial PC (a so-called "IPC"), a computer, possibly including a real-time system, a modular programmable logic controller or a similar control device.

The device that is able to be controlled or the installation that is able to be controlled by means of the security control device may be designed and set up, for example, as a production installation, a machine tool, a robot, an autonomous transport system and/or a similar device, apparatus or installation. For example, the device or the installation may be designed or provided for the manufacturing industry, the process industry, building automation and/or the generation and/or distribution of energy, for a traffic safety system and/or a traffic controller.

The basic control device may correspond, for example, to a control device or to a controller without or with a partial security functionality or else a complete security function. Such a basic control device may be designed and set up, for example, as a central unit of a programmable logic controller, as a programmable logic controller, as an industrial PC, as a PC or a similar device.

In this case, the basic control device may comprise, for example, a real-time operating system which enables real-time control of a device that is connected or is able to be connected to the basic device or of an installation that is connected or is able to be connected thereto.

The security control device may be characterized by means for combining at least one first and one second partial secret to form an overall secret, required to achieve the security function, wherein the at least one first partial secret can be broken down into sections of a predefinable size or length and only the quantity of sections that are able to be processed within a predefinable time period during the execution of a calculation rule according to the size and quantity is gradually able to be combined with the at least second partial secret by means of the calculation rule.

A further aspect of embodiments of the invention are a method for achieving a security function for a security control device for controlling a device or an installation, comprising:
- a basic control device, wherein the basic control device is designed and set up in such a manner that a device that is able to be connected or is connected to the basic control device or an installation that is able to be connected or is connected thereto is able to be controlled or is controlled by means of the execution of a control program in the basic control device, and
- a security module which is designed to provide or execute a cryptographic functionality for the basic control device in order to achieve the security function,
- wherein the security module is able to be connected or is connected, by means of a first coupling interface, to the basic control device by means of a second coupling interface matching the first coupling interface,
having the following steps:
  a) providing at least one first partial secret that is stored in the basic control device,
  b) providing at least one second partial secret that is stored in the security module,
  c) combining the at least one first and second partial secret to form an overall secret, required to achieve the security function, within the time period in which the basic control device interacts with the security module by means of the first and second coupling interfaces, and
  d) disguising the combined overall secret outside said time period.

In connection with embodiments of the invention, "providing" may be understood to mean, for example, creating, loading or storing the partial secret on or from a data storage medium or platform.

One development of embodiments of the invention makes provisions for the overall secret to be temporarily provided in a buffer of the security module for the purpose of processing the content held there, wherein the overall secret is disguised immediately after processing of the content held in the buffer and/or after a predefinable time period and/or at predefinable regular intervals of time.

One development of embodiments of the invention make provisions for the content of the buffer to be retained by means of a power supply from the basic control device.

One development of embodiments of the invention make provisions for the combination of the at least one first and second partial secret to form an overall secret, required to achieve the security function, to be carried out in such a manner that the at least one first partial secret is broken down into sections of a predefinable size or length and only the quantity of sections that are able to be processed within a predefinable time period during the execution of a calculation rule according to the size and quantity are gradually combined with the at least second partial secret by means of the calculation rule.

The first partial secret may be represented in this case by a value, for example a key, generated from a so-called PUF (physical unclonable function).

In this case, the first partial secret may be a public key and the second partial secret may be a private key. Both the first partial secret and the second partial secret may consist of a public portion and a private portion that may also be private or public keys.

In connection with embodiments of the invention, an "(overall) secret", in particular also as a "secret in the form of a character string", may be understood to mean, for example, an item of license information, a cryptographic key, in particular a symmetrical key or a private key of an asymmetrical key pair. In connection with embodiments of the invention, a "secret" may also be understood to mean, for example, a password for accessing an item of license information or a cryptographic key. The secret may be generated, for example, on the basis of a further security guideline that states, for example, a key length or a calculation algorithm for the key. In particular, the expression "reconstructed secret" may be used synonymously in connection with embodiments of the invention.

In connection with embodiments of the invention, a "partial secret" may be understood to mean, for example, a portion of the secret that is preferably stored by one of the components of a device or installation. A secret in the form of a character string may be divided into a plurality of partial character strings, for example, wherein a partial secret comprises at least some of the partial character strings, in particular, and may therefore be subdivided into sections.

In connection with embodiments of the invention, "security-protected" may be understood to mean, for example, the fact that it is possible to have only read access to a security-protected component or storage unit, in particular, or that only a particular component or particular components may have access, in particular. For this purpose, the corresponding security-protected components may have protective modules or seals, for example.

The coupling interface may be designed as a data interface between the security module and the basic control device, which data interface may be a wired or wireless interface, for example. In this case, the first coupling interface and the matching second coupling interface may be effected, for example, using a combination of accordingly complementary plug connector components or else using corresponding contact surfaces or pins. In this case, the interface may be designed and set up as a serial or parallel interface. Furthermore, the interface between the security module and the basic control device may also be designed and set up as a wireless interface, for example a WLAN, Bluetooth or NFC (near field communication) interface. In the case of a wireless interface, the power supply may be implemented in a similar manner to that during wireless charging of mobile radio devices.

Furthermore, the security module may additionally also be mechanically connected to the basic control device, in particular may be releasably connected to the basic control device. Such connections may be effected, for example, using corresponding latching means, clamping means, screwing means or any desired combinations thereof.

It is also possible to provide for the energy to be supplied to the security module via the basic control device, for example via said coupling interfaces or energy supply interfaces integrated therein. The security module may also comprise its own energy source, for example a battery, a rechargeable battery, a capacitor and/or a comparable energy source. The energy source of the security module is used to buffer the buffer in order to be able to disguise its content if the abovementioned connection between the basic control device and the security module is disconnected.

The security function of the security control device may comprise, for example, any function for encryption, for protecting confidentiality, for protecting integrity, for authenticating data and/or the like. In this case, data may be, for example, user data, control data, configuration data and/or administrative data.

In this case, the respective security function of the security control device is achieved by means of interaction between the basic control device and the security module.

In this case, a released security module is understood to mean a security module that at least no longer has a connection to the basic control device. Accordingly, there is no longer any power supply for the security module from the basic control device. Therefore, a secret is then also not stored in the buffer.

In this case, the connection between the basic control device and the security module may be disconnected, for example, by spatially separating the interface connecting elements of the basic control device and the security module. The connection between the basic control device and the security module may be established, for example, by an interface connecting element of the security module and the interface connecting element of the basic control device approaching one another and/or making contact. In this case, the establishment of the connection may furthermore also comprise subsequent communication for establishing a functioning data connection.

Coupling interface connecting elements of the basic control device and the respective security module may comprise or consist of accordingly interacting plug elements, contact elements or else antennas, for example. Furthermore, the security module may be designed and set up in a manner corresponding to a security module according to the present description.

Also claimed is a computer program (product) having program instructions for carrying out said method according to embodiments of the invention when it runs on a security control device as claimed in one of the abovementioned device claims or is stored on a computer-readable medium.

In addition, one variant of the computer program product (non-transitory computer readable storage medium having instructions, which when executed by a processor, perform actions) having program instructions for configuring a creation device may be, for example, a 3-D printer, a computer system or a production machine suitable for creating processors and/or devices.

The methods, apparatuses and computer program (products) may be designed according to the developments/ embodiments of the abovementioned security control device, security module and basic control device and their developments/embodiments.

BRIEF DESCRIPTION

The above-described properties, features and advantages of embodiments of this invention and the manner in which they are achieved become more clearly and distinctly comprehensible in connection with the following description of the exemplary embodiments which are explained in more detail in connection with the FIGURES. In this case, in a schematic illustration:

FIG. 1 depicts a security control device having a basic control device and having a security module for controlling an installation.

DETAILED DESCRIPTION

FIG. 1 shows a security control device E for controlling an installation that is not illustrated in the FIGURE. Input data I and output data O are able to be interchanged between a basic control device G and at least one security module S via a data connection DV by means of a data or I/O interface. The security module may be a security token. The connection or interaction between said device G and said module S may be established via a first coupling interface, for example a plug element, and a second coupling interface matching the first coupling interface, for example a corresponding mating plug element (which are both not explicitly illustrated in the FIGURE). The basic control device also comprises a control unit configured, for example, as a power supply unit SV which is able to be connected or is connected to a volatile buffer FS of the security module S via a supply connection V which may be integrated into the data connection DV. The security module also has a processing unit VE with a processor, wherein a partial secret, for example in the form of a key KS2 or a derivation thereof, is stored in a persistent memory PS2 of the security module. A partial secret KS1 is likewise stored in the persistent memory PS1 of the basic control device G. If there is an existing power supply by SV, the partial secret KS1 is transmitted to the processing unit VE via the data connection DV. The processing unit VE fetches the partial secret KS2 from the memory PS2. These two partial secrets are then combined to form an overall secret K in VE and stored in the buffer FS of the security module S. This overall secret may then be passed on to a device or an installation to achieve a security function by means of the security control device E, in order to use the overall secret, for example a key or a derivation of the overall secret, to achieve encryption in the device or the installation. It should not be possible to use the key or its derivation for calculations if the basic security device is separated from the security module.

In order to calculate the cryptographic function, for example encryption, the required secret (secret key, private key) is divided into a plurality of partial secrets KS1, KS2. In this case, each partial secret should per se meet the respective security requirements imposed on the required cryptographic strength (for example 128-bit symmetrical security). The respective partial secrets may then be connected or combined to form the overall secret required for the cryptographic function (for example by concatenation K:=KS1|KS2 or by derivation of a key from the plurality of partial secrets by means of a key derivation function, abbreviated to KDF, for example K:=KDF(KS1, KS2).

The key K that is formed is available in an erasable buffer FS of the security module. This has the advantage that the key that is formed is available only during operation, and not in a switched-off state.

The modular security component is supplied with power by the basic security device. The connection between the basic device and the security module is configured such that, when the connection is released, the power supply is interrupted. When the power supply is interrupted, the buffer FS loses its storage content and therefore also the combined overall secret K in the form of the key that is formed, for example.

The security module may have battery buffering (for example a capacitor, a supercapacitor, a rechargeable battery, a lithium ion battery) in order to reliably disguise the overall secret K if the power supply is interrupted, for example by erasing it or overwriting it with a predefinable bit pattern.

One part of the cryptographic secret, that is to say the partial secret KS1, is persistently stored in the memory PS1 exclusively outside the security module in the memory of the basic control device G. Another part (partial secret KS2) is persistently stored in the memory PS2 exclusively in the security module S. The overall secret may have been generated beforehand entirely on the security module, such that part of the secret never leaves the security module.

Before the cryptographic function is called, or at the same time, the externally stored part of the secret (partial secret KS1) is transferred to the security module and is factored into the calculation. A calculated secret K is retained in the security module only in a volatile buffer, for example FS. When the connection to the basic control device is disconnected, the secret K on the security module is lost. The required overall secret K is only able to be reconstructed if the security module is connected to the same basic control device again and secret KS1 is transferred to VE again for the purpose of the calculation.

The processing unit VE preferably makes it possible to serially process the partial secret KS1:

In the combination with the partial secret KS2, the following is performed:
KS1[x]: Partial secret KS1 bit x
H: suitable cryptographic one-way function, for example HMAC
K:=H(H(H(KS2|KS1[0])|KS1[1])|KS1[n]), where "|" represents the concatenation of the sections 0 to n of a partial secret—here in the example KS1—in serial processing steps of VE.

The security module may additionally contain a logic unit that detects the voltage drop when the power connection V is disconnected and additionally triggers active overwriting of the volatile buffer FS. For this purpose, the security module has a (small) energy buffer that adequately supplies the volatile buffer FS for the erasing operation.

The plug connection between the basic device and the modular security component may be designed in such a manner that bridging of the power supply is structurally prevented/hindered upon the disconnection of the power connection V. The plug connector may mechanically prevent lateral access to the plug contacts through a wall.

The modular security component may additionally have a sensor system that detects bridging of the power supply from the basic control device and destroys the content of the volatile buffer. For this purpose, the voltage level, an internal resistance or an impedance of the power supply, for example, may be measured and checked for impermissible manipulation.

The volatile buffer in the modular security component may be regularly randomly masked (random mask may also be held in the volatile buffer). This makes it possible to prevent burn-in effects in the volatile buffer. That is to say, the memory content of the secret K can be stored not in plain text but rather only in masked form on the basis of a changing mask that is generated in a random or pseudo-random manner (for example Kstore:=K XOR Mask).

The volatility of the buffer for the partial secret KS1 (typically a few hundred bits) may be increased by means of suitable measures by using possible alternative memory types to conventional DRAM.

Memory technologies or registers or flip-flops are, for example:
  a circular shift register for again avoiding burn-in effects
  a delay line (delay time memory).

Although embodiments of the invention has been more specifically illustrated and described in detail by means of the preferred exemplary embodiment, the invention is not restricted by the examples disclosed and other variations may be derived herefrom by a person skilled in the art without departing from the scope of protection of embodiments of the invention.

The processes or method sequences described above may be implemented on the basis of instructions available on computer-readable storage media or in volatile computer memories (referred to collectively as computer-readable memories below). Computer-readable memories are, for example, volatile memories such as caches, buffers or RAM and non-volatile memories such as removable data storage media, hard disks, etc.

The functions or steps described above may be present in this case in the form of at least one instruction set in/on a computer-readable memory. In this case, the functions or steps are not tied to a particular instruction set or to a particular form of instruction sets or to a particular storage medium or to a particular processor or to particular execution schemes and may be executed alone or in any desired combination by means of software, firmware, microcode, hardware, processors, integrated circuits, etc. In this case, a wide variety of processing strategies may be used, for example serial processing by an individual processor or multiprocessing or multitasking or parallel processing, etc.

The instructions may be stored in local memories, but it is also possible to store the instructions in a remote system and to access them via a network.

The term "processor", "central signal processing", "control unit" or "data evaluation means", as used here, comprises processing means in the broadest sense, that is to say, for example, servers, universal processors, graphics processors, digital signal processors, application-specific integrated circuits (ASICs), programmable logic circuits such as FPGAs, discrete analog or digital circuits and any desired combinations thereof, including all other processing means that are known to a person skilled in the art or will be developed in future. In this case, processors may consist of one or more apparatuses or devices or units. If a processor consists of a plurality of apparatuses, they may be designed or configured for the parallel or sequential processing or execution of instructions.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for achieving a security function for a security control device for controlling a device or an installation, the method comprising:
  providing a basic control device, wherein the basic control device is designed and set up in such a manner that a device that is configured to be connected or is connected to the basic control device or an installation that is configured to be connected or is connected thereto is configured to be controlled or is controlled by the execution of a control program in the basic control device, and
  providing a security module which is configured to provide or execute a cryptographic functionality for the basic control device to achieve the security function,
  wherein the security module is configured to be connected or is connected, by means of a first coupling interface, to the basic control device by means of a second coupling interface matching the first coupling interface,
  wherein the basic control device supplies power to the security module via a power supply,
  wherein the method further comprises:
  a) providing at least one first partial secret that is stored in the basic control device;
  b) providing at least one second partial secret that is stored in the security module;
  c) combining the at least one first and second partial secret to form an overall secret that is stored in the security module, required to achieve the security function, within a time period in which the basic control device interacts with the security module via the first and second coupling interfaces; and
  d) disguising the combined overall secret outside the time period;
  wherein the overall secret stored in the security module is lost when the power supply is interrupted between the basic control device and the security module.

2. The method as claimed in claim 1, wherein the overall secret is temporarily provided in a buffer of the security module for the purpose of processing the content held there, wherein the overall secret is disguised immediately after processing of the content held in the buffer and/or after a predefinable time period and/or at predefinable regular intervals of time.

3. The method as claimed in claim 1, wherein the content of the buffer is retained by means of the power supply from the basic control device.

4. The method as claimed in claim 1, wherein a sensor system is provided in the security module, which sensor system detects an interruption and/or manipulation of the power supply and initiates a follow-up measure where applicable.

5. The method as claimed in claim 1, wherein disconnection and/or eavesdropping and/or manipulation in the interaction, the coupling interfaces, between the basic control device and the security module is detected, ascertained and/or recorded and a follow-up measure is initiated where applicable.

6. The method as claimed in claim 1, wherein the combination of the at least one first and second partial secret to form an overall secret, required to achieve the security function, is carried out in such a manner that the at least one first partial secret is broken down into sections of a predefinable size and only the quantity of sections that are configured to be processed within a predefinable time period during the execution of a calculation rule according to the size and quantity are gradually combined with the at least second partial secret by means of the calculation rule.

7. The method as claimed in claim 1, wherein the first partial secret is represented by a value generated from a physical unclonable function (PUF).

8. A security module for achieving a security function, for a security control device for controlling a device or an installation, comprising:
- a means for providing or executing a cryptographic functionality for a basic control device for achieving the security function, which basic control device is configured to control a device that is configured to be connected or is connected to the basic control device or an installation that is configured to be connected or is connected thereto by means of the execution of a control program in the basic control device, wherein the security module is configured to be connected or is connected, by means of a first coupling interface, to the basic control device by means of a second coupling interface matching the first coupling interface, wherein the basic control device supplies power to the security module via a power supply;
- a means for receiving at least one first partial secret that is stored in the basic control device;
- a means for providing at least one second partial secret that is stored in the security module;
- a means for combining the at least one first and second partial secret to form an overall secret that is stored in the security module, required to achieve the security function, within a time period in which the basic control device interacts with the security module by means of the first and second coupling interfaces; and
- a means for disguising the combined overall secret outside the time period;
- wherein the overall secret stored in the security module is lost when the power supply is interrupted between the basic control device and the security module.

9. The security module as claimed in claim 8, wherein it further comprising a means for detecting disconnection and/or eavesdropping and/or manipulation in the interaction, by the coupling interfaces, between the basic control device and the security module and is configured to initiate a follow-up measure.

10. A basic control device for achieving a security function, for a security control device for controlling a device or an installation, which basic control device is configured to control a device that is configured to be connected or is connected to the basic control device or an installation that is configured to be connected or is connected thereto by means of the execution of a control program in the basic control device,
- wherein the basic control device is configured to be connected or is connected, by means of a first coupling interface, to a security module by means of a second coupling interface matching the first coupling interface, wherein the basic control device supplies power to the security module via a power supply, the basic control device comprising:
  - a means for sending at least one first partial secret, which is stored in the basic control device, to the security module for the combination of the at least one first and of at least one second partial secret that is stored in the security module, to form an overall secret that is stored in the security module required to achieve the security function, wherein the security module is configured to provide or execute a cryptographic functionality for the basic control device to achieve the security function; and
  - a control unit configured to control retaining of the content of a buffer provided for the overall secret and to initiate disguising of the content of the buffer;
- wherein the overall secret stored in the security module is lost when the power supply is interrupted between the basic control device and the security module.

11. The basic control device as claimed in claim 10, wherein the control unit is embodied as the power supply unit that ensures that the content of the buffer is retained by means of a power supply and initiates the disguising of the content by interrupting the power supply.

12. A security control device comprising the basic control device as claimed in claim 10 and the security module.

13. The basic control device as claimed in claim 10, wherein means for combining the at least one first and second partial secret to form an overall secret, required to achieve the security function, wherein the at least one first partial secret is configured to be broken down into sections of a predefinable size and only the quantity of sections that are configured to be processed within a predefinable time period during the execution of a calculation rule according to the size and quantity is configured to be gradually combined with the at least second partial secret by means of the calculation rule.

14. A computer program product, comprising a computer readable hardware storage device having computer readable program code stored therein, said program code executable by a processor of a computer system to implement a method comprising:
- providing a basic control device, wherein the basic control device is designed and set up in such a manner that a device that is configured to be connected or is connected to the basic control device or an installation that is configured to be connected or is connected thereto is configured to be controlled or is controlled the execution of a control program in the basic control device, and
- providing a security module which is configured to provide or execute a cryptographic functionality for the basic control device to achieve a security function,
- wherein the security module is configured to be connected or is connected, by means of a first coupling interface, to the basic control device by means of a second coupling interface matching the first coupling interface,
- providing at least one first partial secret that is stored in the basic control device;
- providing at least one second partial secret that is stored in the security module;
- combining the at least one first and second partial secret to form an overall secret that is stored in the security module, required to achieve the security function, within a time period in which the basic control device interacts with the security module via the first and second coupling interfaces; and
- disguising the combined overall secret outside the time period;
- wherein the overall secret stored in the security module is lost when the power supply is interrupted between the basic control device and the security module.

* * * * *